US012756953B2

(12) United States Patent
Chen et al.

(10) Patent No.: US 12,756,953 B2
(45) Date of Patent: Oct. 6, 2026

(54) PHOTOSENSITIVE CHIP, IMAGE PROCESSING METHOD, AND ELECTRONIC DEVICE

(71) Applicant: Lenovo (Beijing) Limited, Beijing (CN)

(72) Inventors: Jiefeng Chen, Beijing (CN); Wenhua Long, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 22 days.

(21) Appl. No.: 18/818,520

(22) Filed: Aug. 28, 2024

(65) Prior Publication Data

US 2025/0080875 A1 Mar. 6, 2025

(30) Foreign Application Priority Data

Aug. 29, 2023 (CN) ........................ 202311102929.0

(51) Int. Cl.
*H04N 25/75* (2023.01)
*H04N 25/772* (2023.01)
*H04N 25/78* (2023.01)

(52) U.S. Cl.
CPC .......... *H04N 25/75* (2023.01); *H04N 25/772* (2023.01); *H04N 25/78* (2023.01)

(58) Field of Classification Search
CPC ....... H04N 25/75; H04N 25/772; H04N 25/78
USPC ........................................................ 348/308
See application file for complete search history.

(56) References Cited

FOREIGN PATENT DOCUMENTS

CN 110488519 * 7/2019

* cited by examiner

*Primary Examiner* — Joel W Fosselman
(74) *Attorney, Agent, or Firm* — ANOVA LAW GROUP, PLLC

(57) ABSTRACT

A photosensitive chip includes a photosensitive array and a target transmission channel. The photosensitive array is configured to generate an induced electrical signal. A target image signal is generated from the induced electrical signal through the target transmission channel. The target image signal is used to generate a target image. Target image represents a change in a target space.

16 Claims, 6 Drawing Sheets

PHOTOSENSITIVE CHIP, IMAGE PROCESSING METHOD, AND ELECTRONIC DEVICE

CROSS-REFERENCE TO RELATED APPLICATION

The present disclosure claims priority to Chinese Patent Application No. 202311102929.0, filed on Aug. 29, 2023, the entire content of which is incorporated herein by reference.

TECHNICAL FIELD

The present disclosure relates to the image processing field and, more particularly, to a photosensitive chip, an image processing method, and an electronic device.

BACKGROUND

Currently, a movement trend is determined through a software algorithm based on an image output by a camera. The method has low real-time performance because the software algorithm requires a large number of resources of a central processing unit (CPU or AP) to perform image computation, which consumes the resources and also affects the speed of determining the movement trend.

SUMMARY

The present disclosure provides a photosensitive chip including a photosensitive array and a target transmission channel. The photosensitive array is configured to generate an induced electrical signal. A target image signal is generated from the induced electrical signal through the target transmission channel. The target image signal is used to generate a target image, and the target image represents a change in a target space.

The present disclosure provides an image processing method. The method includes obtaining a target image and processing the target image to obtain a change amount in the target space. The target image is generated from a target image signal provided by a photosensitive chip of an image collection apparatus. The target image represents a change in a target space collected by the image collection apparatus; and The present disclosure provides an electronic device, including an image collection apparatus and a processor. The processor is configured to instruct the image collection apparatus with target instructions to cause the image collection apparatus to provide a target image, the target image representing a change in a target space collected by the image collection apparatus.

DETAILED DESCRIPTION OF THE EMBODIMENTS

To make the objectives, technical solutions, and advantages of embodiments of the present disclosure clearer, the technical solutions of embodiments of the present disclosure are further described in detail in connection with the accompanying drawings of embodiments of the present disclosure. Embodiments of the present disclosure are used to describe the present disclosure but not limit the scope of the present disclosure.

In the following description, "some embodiments" refers to a subset of all possible embodiments. "some embodiments" can be the same subset or different subsets of all possible embodiments and can be combined with each other when there is no conflict.

In the following description, the terms "first," "second," and "third" are used to distinguish similar objects and do not represent a specific order for the objects. "first," "second," and "third" can be interchanged in a specific order or sequence as allowed. Thus, embodiments of the present disclosure can be implemented in a sequence other than the order illustrated or described here.

Unless otherwise defined, all technical and scientific terms used here have the same meanings as commonly understood by those skilled in the art. The terminology used here is for the purpose of describing the purpose of embodiments of the present disclosure and is not intended to limit the present disclosure.

Figure 1A:
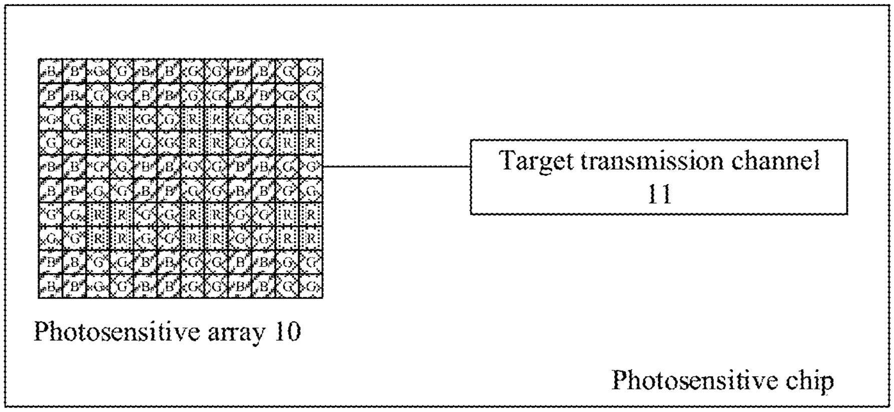
FIG. 1A illustrates a schematic diagram of a photosensitive chip according to some embodiments of the present disclosure.

Embodiments of the present disclosure provide a photosensitive chip. As shown in FIG. 1A, the photosensitive chip includes a photosensitive array 10 configured to generate an induced electrical signal.

The photosensitive array can include a Charge-Coupled Device (CCD) or a Complementary Metal Oxide Semiconductor (CMOS).

CCD can be a silicon wafer used to detect light. CCD can be a solid electronic device that generates changes in the semiconductor potential well can be generated and controlled through a clock pulse voltage to store and transmit charge information. A CMOS image sensor can be a solid image sensor using CMOS. Similar to a CCD image sensor, the CMOS image sensor can include a photodiode (PD) and have a different manufacturing process and a signal reading method.

In some embodiments, the photosensitive array can convert a detected optical signal into an induced electrical signal for output.

The photosensitive array also includes a target transmission channel 11. A target image signal can be generated from the induced electrical signal through the target transmission channel. The target image signal can be used to generate a target image. The target image can represent the change of the target space.

The target image signal can be a voltage change collected at each pixel point between two neighboring moments. The voltage change can be used to generate the target image. The target image can represent the change in the target space.

Figure 1B:
FIG. 1B illustrates a schematic diagram of a target image according to some embodiments of the present disclosure.

FIG. 1B illustrates a schematic diagram of a target image according to some embodiments of the present disclosure. As shown in FIG. 1B, the palm formed by white dots and the palm formed by black dots represent position information of the palm two times. A change trajectory of the palm movement can be obtained according to the position information two times.

In some embodiments, when the target image signal is zero, no change is in the target space, and a black image can be output.

In embodiments of the present disclosure, the photosensitive chip includes the photosensitive array configured to generate the induced electrical signals, and the target transmission channel configured to generate the target image signal when the induced electrical signal passes the target transmission channel. The target image signal can be used to generate the target image. The target image can be used to represent the change in the target space. Thus, the target transmission channel of the photosensitive chip can be configured to obtain the target image signal that is used to represent the change in the target space. A change amount of the target image can be directly output through a camera module. That is, the change amount can be determined through a hardware module (e.g., a subtractor) of a hardware circuit without a software algorithm. The real-time performance can be high. By obtaining the target image signal to generate the target image, the efficiency of obtaining the change in the target space can be effectively improved, and the computation resources of the processor can be saved.

Figure 2A:
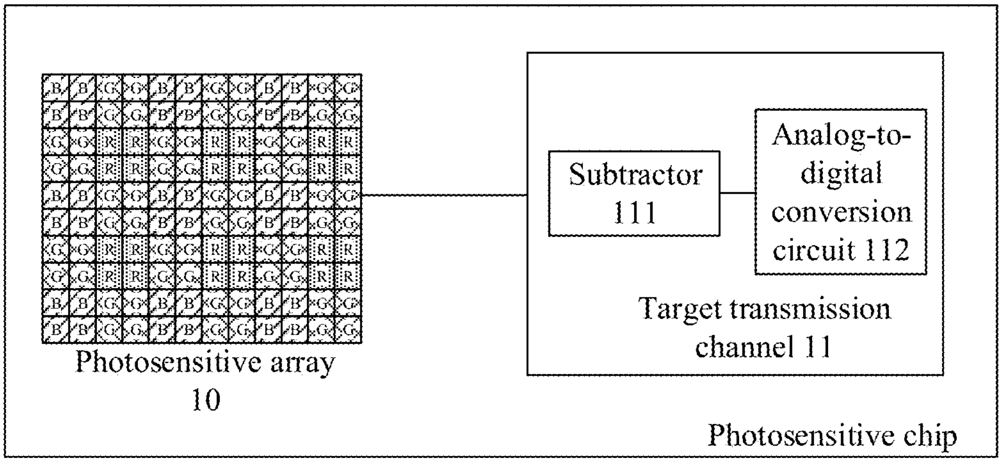
FIG. 2A illustrates a schematic diagram of a photosensitive chip according to some embodiments of the present disclosure.

FIG. 2A illustrates a schematic diagram of a photosensitive chip according to some embodiments of the present disclosure. In some embodiments, as shown in FIG. 2A, the target transmission channel includes a subtractor 11.

The subtractor 11 can be configured to perform subtraction on an induced electrical signal at an N-th moment and an induced electrical signal at an (N−1)-th moment to generate a target electrical signal. N can be an integer greater than or equal to 1. The target electrical signal can include a first type electrical signal and a second type electrical signal different from the first type electrical signal. The first type electrical signal can be used to represent a part of the photosensitive array at the N-th moment and a part of the photosensitive array at the (N−1)-th moment that are the same. The second type electrical signal can be used to represent a part of the photosensitive array at the N-th moment and a part of the photosensitive array at the (N−1)-th moment that are different.

In some embodiments, the subtractor can first obtain the induced electrical signal at the N-th moment and the induced electrical signal at the (N−1)-th moment and perform the subtraction on the induced electrical signal at the N-th moment and the induced electrical signal at the (N−1)-th moment to generate the target electrical signal.

For example, as shown in FIG. 1B, white dots can be dots with negative values after the subtraction, and white dots can be dots with positive values after the subtraction. Similarly, in some embodiments, the white dots can be the dots with positive values after the subtraction, and the black dots can be dots with negative values after the subtraction. Thus, the palm contour formed by the white dots can represent the palm position at the first moment, and the palm contour formed by the black dots can represent the palm position at a second moment. The first moment and the second moment can be different moments.

Here, the first type electrical signal can be used to represent the part of the photosensitive array at the N-th moment and the part of the photosensitive array at the N−1th moment that are the same. In some embodiments, since the photosensitive array at the N-th moment and the photosensitive array at the (N−1)-th moment are the same, the induced electrical signal at the N-th moment and the induced electrical signal at the (N−1)-th moment can be the same. That is, the induced electrical signal at the N-th moment subtracted by the induced electrical signal at the (N−1)-th moment can be zero. Thus, the value of the first type electrical signal can be zero.

The second type electrical signal can be used to represent the part of the photosensitive array at the N-th moment and the part of the photosensitive array at the (N−1)-th moment that are different. In some embodiments, since the photosensitive array at the N-th moment and the photosensitive array at the (N−1)-th moment are different, a difference value can be obtained by subtracting the induced electrical signal at the N-th moment from the induced electrical signal at the (N−1)-th moment. Thus, the value of the first type electrical signal can be the difference value.

An analog-to-digital conversion circuit 112 can be connected to the subtractor 111 and configured to convert the target electrical signal into the target image signal.

The analog-to-digital conversion circuit can be configured to convert the target electrical signal output by the subtractor 111 into a digital signal. The digital signal can be used to generate the target image signal.

In embodiments of the present disclosure, the target transmission channel can include the subtractor and the analog-to-digital conversion circuit. The subtractor can be configured to perform subtraction processing on the induced electrical signals at two neighboring moments to obtain the target electrical signal. The analog-to-digital conversion circuit can be configured to convert the target electrical signal into a digital signal. Thus, the target image signal representing the change in the target space can be generated based on the digital signal.

Figure 2B:
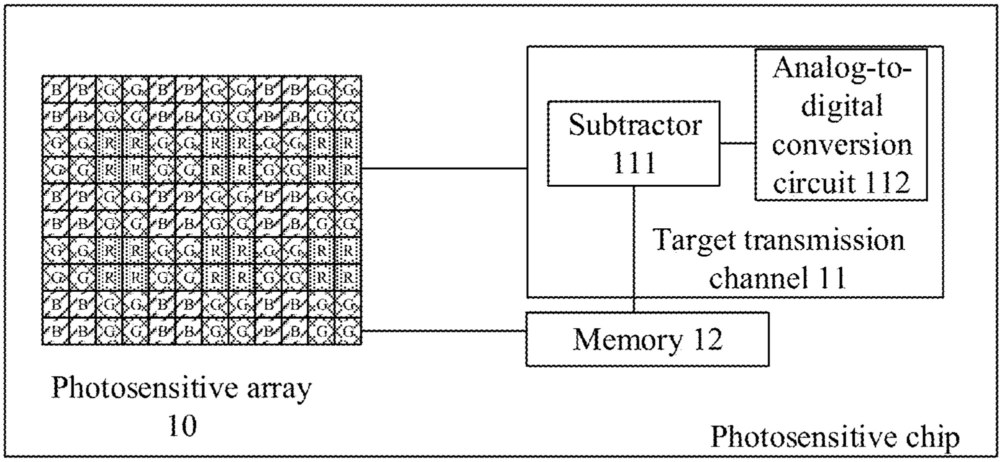
FIG. 2B illustrates a schematic diagram of a photosensitive chip according to some embodiments of the present disclosure.

FIG. 2B illustrates a schematic diagram of a photosensitive chip according to some embodiments of the present disclosure. In some embodiments, as shown in FIG. 2B, the photosensitive chip further includes a memory 12 connected to the subtractor 111 and configured to store the induced electrical signal at the (N−1)-th moment.

In some embodiments, the memory can store the induced electrical signal at the (N−1)-th moment. When receiving the induced electrical signal at the N-th moment, the induced electrical signal at the (N−1)-th moment can be output to the subtractor. Thus, the induced electrical signal at the N-th moment can be subtracted by the induced electrical signal at the (N−1)-th moment in the subtractor.

In some embodiments, the memory can be controlled to output the induced electrical signal at the (N−1)-th moment at the N-th moment through the timing sequence control logic.

In embodiments of the present disclosure, the memory can be connected to the subtractor and configured to store the induced electrical signal at the (N−1)-th moment. Thus, the subtractor can simultaneously obtain the induced electrical signal at the N-th moment and the induced electrical signal at the (N−1)-th moment.

Figure 2C:
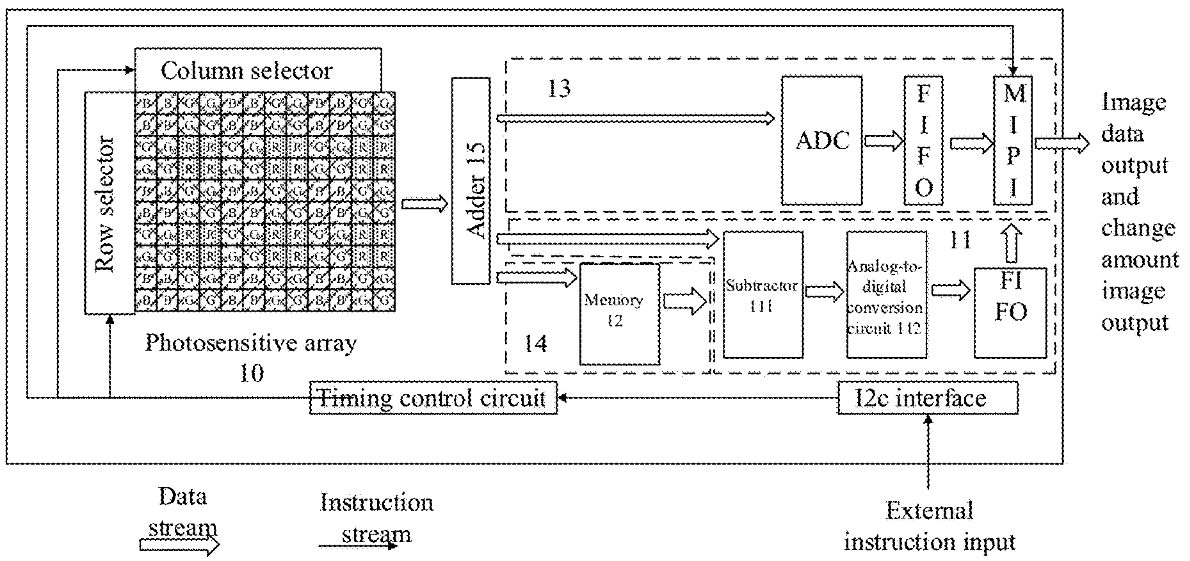
FIG. 2C illustrates a schematic diagram of a photosensitive chip according to some embodiments of the present disclosure.

FIG. 2C illustrates a schematic diagram of a photosensitive chip according to some embodiments of the present disclosure. In some embodiments, as shown in FIG. 2C, the photosensitive chip further includes a first transmission channel 13.

The first image signal can be generated from the induced electrical signal when the induced electrical signal passes through the first transmission channel. The first image signal can be used to generate the first image. The first image can be used to represent the target space.

The first transmission channel 13 can at least include an analog-to-digital conversion circuit (ADC), a first-in-first-out (FIFO) data buffer, and a mobile industry processor interface (MIPI). FIFO can be configured to select pixels that are expected to be processed through a row selection circuit and a column selection circuit and read the electrical signals of the pixels. During the selection process, a row selection logic unit and a column selection logic unit can cooperate to realize an image window extraction function. MIPI can be used to standardize interfaces in the cell phone such as camera and display interfaces and radio frequency/baseband interfaces to reduce the complexity degree of the cell phone design and increase the design flexibility.

Figure 2D:
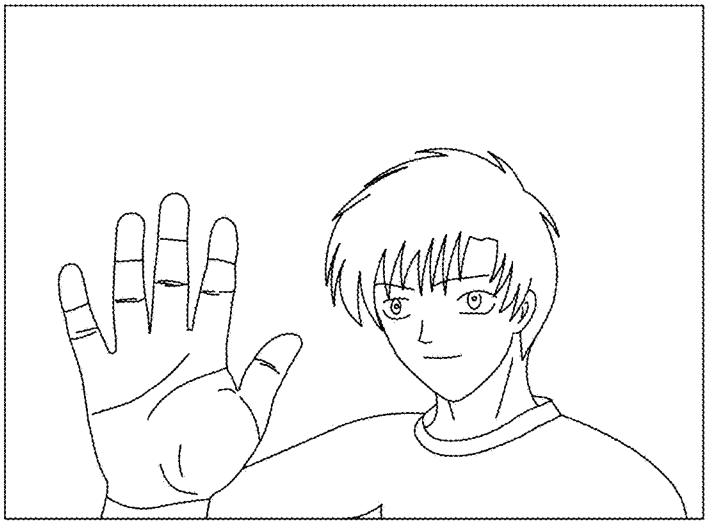
FIG. 2D illustrates a schematic diagram showing an example of a first image according to some embodiments of the present disclosure.

In some embodiments, the first transmission channel can be configured to output the first image representing the target space. FIG. 2D is an example of the first image of embodiments of the present disclosure. As shown in FIG. 2D, a two-dimensional image includes a person with a palm facing forward.

The photosensitive chip further includes a second transmission channel 11. The second transmission channel can be the target transmission channel 11.

In some embodiments, the target transmission channel 11 can output the target image signal. The target image signal can be used to generate the target image. The target image can be used to represent the change in the target space. As shown in FIG. 2D, the position of the palm in FIG. 1B changes. That is, the palm can be determined to have waved.

The photosensitive chip further includes a third transmission channel 14 connected to the memory 12. The induced electrical signal can be stored through the third transmission channel.

The memory 12 of the third transmission channel 14 can be connected to the subtractor 111 and can store the induced electrical signal at the (N−1)-th moment. Thus, the subtractor can simultaneously obtain the induced electrical signal at the N-th moment and the induced electrical signal at the (N−1)-th moment.

In some embodiments, as shown in the photosensitive chip in FIG. 2C, the induced electrical signal reaches the subtractor through the third transmission channel a moment later than the induced electrical signal reaches the subtractor through the second transmission channel.

Thus, the subtractor can simultaneously obtain the induced electrical signal at the N-th moment and the induced electrical signal at the (N−1)-th moment.

In some embodiments, as shown in FIG. 2C, the photosensitive chip further includes a timing sequence control circuit. The timing sequence control circuit is connected to the photosensitive array to receive an external command obtained through I2C and control the photosensitive chip to simultaneously output the first image signal and the target image signal. The first image signal can be obtained based on the induced electrical signal of the current frame.

In embodiments of the present disclosure, the first transmission channel can be configured to generate the first image signal when the induced electrical signal passes through the first transmission channel. The first image signal can be used to generate the first image. The first image can represent the target space. The second transmission channel can be the target transmission channel. The third transmission channel can be connected to the memory. The induced electrical signal can be stored through the third transmission channel. Thus, the photosensitive chip can simultaneously output the first image signal representing the target space and the target image signal representing the change in the target space.

In some embodiments, as shown in FIG. 2C, the photosensitive chip further includes an adder 15.

Figure 2E:
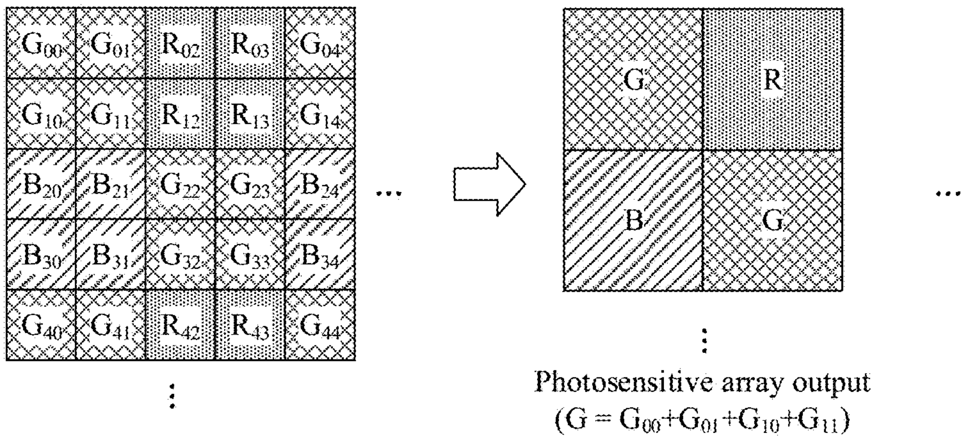
FIG. 2E illustrates a schematic diagram of a photosensitive array output photo according to some embodiments of the present disclosure.

FIG. 2E illustrates a schematic diagram of a photosensitive array output photo according to some embodiments of the present disclosure. As shown in FIG. 2E, the output of the green member is overlapped by four pixels, i.e., induced electrical signal G being obtained by adding $G_{00}$, $G_{01}$, $G_{10}$, and $G_{11}$.

In the implementation, the photosensitive array 10 can be configured to obtain an optical signal of the current frame and convert the optical signal of the current frame into the induced electrical signal of the current frame.

In some embodiments, at least one pixel corresponding to each color of the photosensitive array 10 can obtain the optical signal corresponding to the pixel. The optical signal corresponding to the at least one pixel can be converted into the induced electrical signal of the at least one pixel.

The photosensitive array can be connected to the adder 15 and configured to send the electrical signal of the at least one pixel to the adder 15.

Figure 2F:
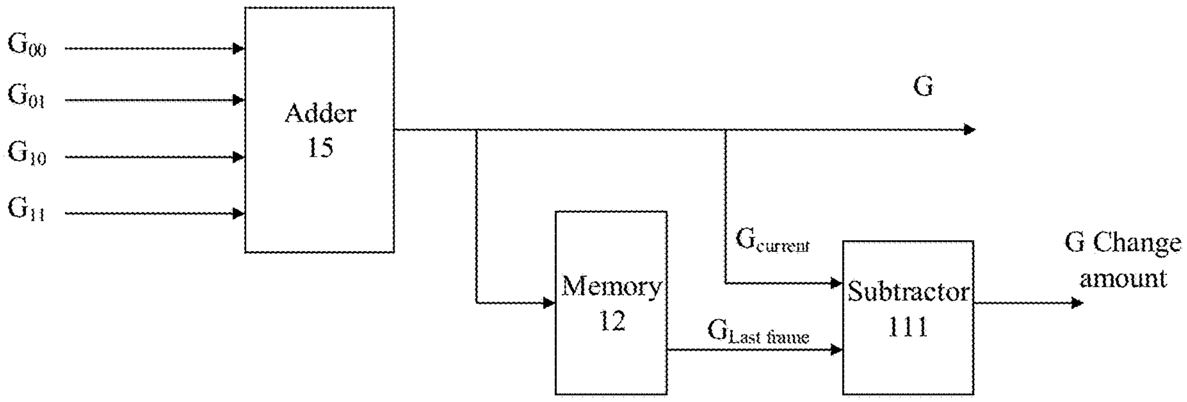
FIG. 2F illustrates a schematic flowchart of processing an inducing electrical signal according to some embodiments of the present disclosure.

FIG. 2F illustrates a schematic flowchart of processing an inducing electrical signal according to some embodiments of the present disclosure. As shown in FIG. 2F, the adder 15 is configured to perform addition calculation on the electrical signal of the at least one pixel ($G_{00}$, $G_{01}$, $G_{10}$, and $G_{11}$) corresponding to each color to obtain the induced electrical signal G of the current frame corresponding to each color. The adder 15 is connected to the memory 12 and configured to send the induced electrical signal G of the current frame to the memory 12. In the implementation, the subtractor 111 can simultaneously obtain the change amount by subtracting the current G and the G of the last frame.

In some embodiments, the photosensitive chip can further include an input interface and an output interface.

The input interface can be configured to obtain the target command.

The output interface can be configured to output the first image signal and the target image signal based on the target command.

In the implementation, as shown in FIG. 2C, the photosensitive chip can receive an acquisition target command through I2C to output the first image signal and the target image signal at the output interface.

In embodiments of the present disclosure, the photosensitive chip can further include the input interface configured to obtain the target command, and the output interface configured to output the first image signal and the target image signal based on the target command. Thus, the first image signal and the target image signal can be output based on the target command.

Embodiments of the present disclosure provide an image collection apparatus, including a camera lens and a photosensitive chip.

The camera lens can be configured to project the light reflected from a photographed object onto the photosensitive chip of the camera through the lens to form a target image.

The photosensitive chip can be configured to convert an optical signal into an induced electrical signal. The target image signal can be generated when the induced electrical signal passes through the target transmission channel of the photosensitive chip. The target image signal can be used to generate the target image. The target image can be used to represent the changes in the target space.

The image collection apparatus of embodiments of the present disclosure can output the target image signal through the target transmission channel configured in the photosensitive chip to obtain the target image representing the changes in the target space.

Figure 3:
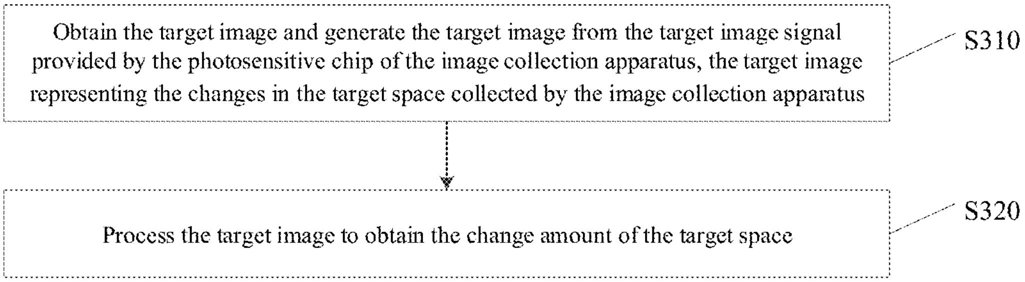
FIG. 3 illustrates a schematic flowchart of an image processing method according to some embodiments of the present disclosure.

FIG. 3 illustrates a schematic flowchart of an image processing method according to some embodiments of the present disclosure. As shown in FIG. 3, the method includes the following steps.

At S310, the target image is obtained. The target image is generated from the target image signal provided by the photosensitive chip of the image collection apparatus. The target image represents the changes in the target space collected by the image collection apparatus.

The image processing method can be applied to the electronic device that includes the image collection apparatus and a processor.

In the implementation, the target image signal can be obtained by the photosensitive chip of the image collection apparatus. The photosensitive chip can be the photosensitive chip of any of FIG. 1A, 2A, 2B, or 2C. The method for obtaining the target image signal includes generating the target image signal when the induced electrical signal passes through the target transmission channel. Thus, the obtained target image signal can be used to generate the target image representing the changes in the target space.

At S320, the target image is processed to obtain the change amount of the target space.

In the implementation, the processor of the electronic device can be configured to process the obtained target image to obtain the change amount of the target space.

In some embodiments, the target image can be first obtained. The target image can be generated from the target image signal provided by the photosensitive chip of the image collection apparatus. The target image can represent the changes in the target space collected by the image collection apparatus. Then, the target image can be processed to obtain the change amount of the target space. Thus, the target image can be directly provided based on the photosensitive chip to obtain the change amount in the target space. The real-time performance can be high, and the image processing speed can be effectively improved.

In some embodiments, the image processing method further includes the following steps.

At S330, the first image is obtained. The target image is generated from the first image signal provided by the photosensitive chip of the image collection apparatus. The first image represents the target space. The first image signal and the target image signal are induced electrical signals induced at the same moment based on the photosensitive chip of the image collection apparatus.

In the implementation, the first image signal representing the target space is output using the first transmission channel 13 shown in FIG. 2C. FIG. 2D illustrates an example of the first image of embodiments of the present disclosure. FIG. 2D illustrates the person with the palm facing forward. Simultaneously, the target image signal is obtained using the first transmission channel (target transmission channel) 13 shown in FIG. 2C. FIG. 1B illustrates an example of a target image of embodiments of the present disclosure. As shown in FIG. 1B, the target image that is generated from the target electrical signal obtained after performing subtraction on the induced electrical signal at the N-th moment and the induced electrical signal at the (N−1)-th moment is illustrated. After performing the subtraction on the induced electrical signal at the N-th moment and the induced electrical signal at the (N−1)-th moment, the target electrical signal can include electrical signals for forming the black dots, white dots, and gray dots. The gray dots can be used to represent the same part at the photosensitive chip at the N-th moment and the (N−1)-th moment. The black dots can be used to represent the parts at the photosensitive chip that are different at the N-th moment and the (N−1)-th moment. The white dots can be used to represent the parts at the photosensitive chip that are different at the N-th moment and the (N−1)-th moment. For example, the photographed object in the first image can be a person with the palm facing forward. In the target image, the changed target object (e.g., the palm) can be represented, and the change trend of the target object (e.g., positions of the palm formed by the white dots and the palm formed by the black dots being different) can be illustrated.

At S340, the target object is determined based on the first image and the target image. The target object represents the object changes in the target space. Since the target image directly represents the changes in the target object, the change amount of the target object is obtained by processing the target image (i.e., the change amount being determined according to the position of the black dots and the position of the white dots).

The change amount of the target space obtained by processing the target image can represent the change amount of the target object.

Since the first image and the target image both include the same target object, the target object can be determined using the first image and the target image. Therefore, the target object (e.g., palm) can be determined by overlapping the first image and the target image.

In the implementation, since the target object can be an object changing in the target space, the change amount of the target space can represent the change amount of the target object.

In some embodiments, the first image can be obtained first. The target image can be generated from the first image signal provided by the photosensitive chip of the image collection apparatus. The first image can represent the target space. The first image signal and the target image signal can be the induced electrical signals induced at the same moment by the photosensitive chip of the image collection apparatus. Then, the target object can be determined based on the first image and the target image. The target image can represent the object changing in the target space. Thus, the object changing in the target space can be determined using the first image and the target image provided at the same moment.

In some embodiments, determining the target object based on the first image and the target image can include obtaining the target object with features matching based on the first image and the target image.

During implementation, the first image and the target image can be superimposed. After superimposition, an object with overlapping edges meets the feature matching and can be determined as the target object in the first image.

In some embodiments, based on the first image and the target image, the target object with the feature matching can be obtained. That is, the target object that changes can be determined.

In some embodiments, obtaining the change amount of the target space by processing the target image can include the following processes.

At 321, a first feature and a second feature in the target image are obtained.

During implementation, the target image can include object contours drawn in two different colors or lines, which can be determined as the first feature and the second feature, respectively. FIG. 1B illustrates different contours drawn by white dots and black dots. The first feature formed by the white dots and the second feature formed by the black dots can be obtained based on FIG. 1B.

At 322, the change amount between the first feature and the second feature is determined.

During implementation, the change amount can be determined based on the position information of the first feature and the position information of the second feature in the image.

In some embodiments, the first feature and the second feature in the target image can be obtained first. Then, the change amount between the first feature and the second feature can be determined. Thus, the change amount of the target object can be obtained based on the target image.

Figure 4:
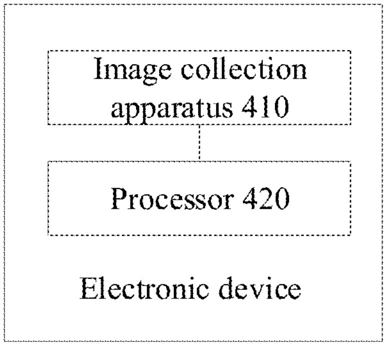
FIG. 4 illustrates a schematic structural diagram of an electronic device according to some embodiments of the present disclosure.

FIG. 4 illustrates a schematic structural diagram of an electronic device according to some embodiments of the present disclosure. As shown in FIG. 4, the electronic device includes an image collection apparatus 410 and a processor 420.

The processor 420 can be configured to instruct the image collection apparatus with a target command to cause the image collection apparatus to provide a target image. The target image can be used to represent the changes in the target space collected by the image collection apparatus.

In some embodiments, the target command can be used to start the image collection apparatus 410. The processor can be configured to process the target image and the first image provided by the image collection apparatus to determine the target object and the change of the target object. In addition, since the change of the target object is known, the electronic device can be configured to track the target object based on the change of the target object or perform focusing based on the movement or the moving target object determined by the change of the target object. Since the image collection apparatus provides the first image and the target image at the same moment, i.e., provides the first image while providing the target image, the moving target object (the moving target object being the palm) can be known. Compared to the image collection apparatus that can only provide the first image, cache a plurality of first images depending on the processor (CPU or AP), and determine the movement or movement trend by analyzing the two neighboring first images through the software algorithm running at the processor, with the electronic device of embodiments of the present disclosure, the efficiency can be improved, and the time for determining the movement and the change trend can be reduced. For example, in a focused scene for the moving target object, since the time for determining the movement and the change trend is reduced, the accuracy and the real-time performance of performing focus on the moving target object can be effectively improved. Thus, the image photographed for the moving target object can be clear.

The electronic device can detect moving objects. For example, when the current focusing object moves, the electronic device can follow and focus. If a background object moves, the electronic device does not follow and focus. Thus, the electronic device can perform movement detection on key-focused objects in the image.

In some embodiments, the electronic device can follow and focus on the moving objects. After obtaining a series of images showing the change amount of the focused object, the electronic device can determine the movement direction and speed and focus on the moving object according to the data.

In some embodiments, the electronic device can determine a foreground depth and a background depth. By obtaining the data of the moving object, the basic contour of the moving object can be determined. Objects moving on a same movement plane can be determined as the foreground depth, while non-moving objects can be determined as the background depth.

In some embodiments, the electronic device can be configured to create a slow-motion video. After obtaining the data of the moving object, the movement direction and position of the object can be determined. At least one virtual image can be obtained by performing a difference calculation on two images. The virtual image can be inserted between the two images. After the number of images is increased, the slow-motion video can be obtained by playing at the speed of the previous video.

The electronic device of embodiments of the present disclosure can receive the target command to cause the image collection apparatus to provide the target image that represents the change in the target space.

Figure 5A:
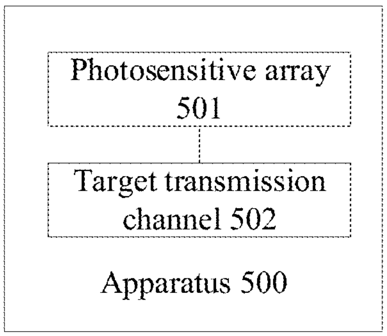
FIG. 5A illustrates a schematic structural diagram of a photosensitive chip according to some embodiments of the present disclosure.

Based on the above, FIG. 5A illustrates a schematic structural diagram of a photosensitive chip according to some embodiments of the present disclosure. As shown in FIG. 5A, the photosensitive chip 500 includes a photosensitive array 501 and a target transmission channel 502.

The photosensitive array 501 can be configured to generate an induced electrical signal.

The target image signal can be generated when the induced electrical signal passes through the target transmission channel 502. The target image signal can be used to generate the target image. The target image can be used to represent the change in the target space.

In some embodiments, the target transmission channel can include a subtractor and an analog-to-digital conversion circuit. The subtractor can be configured to perform subtraction on the induced electrical signal at the N-th moment and the induced electrical signal at the (N−1)-th moment to generate the target electrical signal. N can be an integer greater than or equal to 1. The analog-to-digital conversion circuit can be connected to the subtractor and configured to convert the target electrical signal into the target image signal.

In some embodiments, the photosensitive chip can further include a memory connected to the subtractor and used to store the induced electrical signal at the (N−1)-th moment.

In some embodiments, the photosensitive chip can further include a first transmission channel. The first image signal can be generated when the induced electrical signal passes through the first transmission channel. The first image signal can be used to generate the first image. The first image can be used to represent the target space. The photosensitive chip can further include a second transmission channel. The second transmission channel can be the target transmission channel. The photosensitive chip can further include a third transmission channel connected to the memory. The induced electrical signal can be stored through the third transmission channel.

In some embodiments, the induced electrical signal can reach the subtractor via the third transmission channel one moment later than the induced electrical signal reaching the subtractor via the second transmission channel.

In some embodiments, the photosensitive chip can further include an input interface configured to obtain the target command and an output interface configured to output the first image signal and the target image signal based on the target command.

Figure 5B:
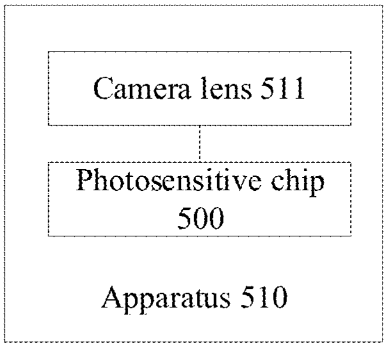
FIG. 5B illustrates a schematic structural diagram of an image collection apparatus according to some embodiments of the present disclosure.

Based on the above, FIG. 5B illustrates a schematic structural diagram of an image collection apparatus 510 according to some embodiments of the present disclosure. As shown in FIG. 5B, the apparatus 510 includes a camera lens 511 and a photosensitive chip 500.

The camera lens 511 can be configured to project the light reflected by the photographed object to the photosensitive chip 512 of the camera after being refracted and focused through the lens to form the target image.

The photosensitive chip 500 can be configured to convert the optical signal into the induced electrical signal. The target image signal can be generated from the induced electrical signal through the target transmission channel of the photosensitive chip. The target image signal can be used to generate the target image. The target image can be used to represent the change in the target space.

Based on the above, embodiments of the present disclosure further provide an image processing apparatus. The apparatus can include various modules. The modules can include various sub-modules, which can be implemented by the processor of the electronic device or a specific logic circuit. In the implementation, the processor can be a central processing unit (CPU), a microprocessor unit (MPU), a digital signal processor (DSP), or a field programmable gate array (FPGA).

Figure 5C:
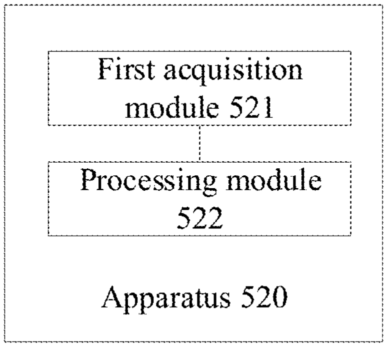
FIG. 5C illustrates a schematic structural diagram of an image processing apparatus according to some embodiments of the present disclosure.

FIG. 5C illustrates a schematic structural diagram of an image processing apparatus 520 according to some embodiments of the present disclosure. As shown in FIG. 5C, the apparatus 520 includes a first acquisition module 521 and a processing module 522.

The first acquisition module 521 can be configured to obtain the target image. The target image can be generated by the target image signal provided by the photosensitive chip of the image collection apparatus. The target image can be used to represent the change in the target space collected by the image collection apparatus.

The processing module 522 can be configured to process the target image to obtain the change amount of the target space.

In some embodiments, the image processing apparatus can further include a second acquisition module and a determination module. The second acquisition module can be configured to obtain the first image. The target image can be generated by the first image signal provided by the photosensitive chip of the image collection apparatus. The first image can be used to represent the target space. The first image signal and the target image signal can be the induced electrical signals induced at the same moment based on the photosensitive chip of the image collection apparatus. The determination module can be configured to determine the target object based on the first image and the target image. The target object can be used to represent the object that changes in the target space. The change amount of the target space obtained by processing the target image can be the change amount of the target object.

In some embodiments, the determination module can be further configured to obtain the target object that satisfies the feature matching based on the first image and the target image.

In some embodiments, the processing module 522 can include an acquisition sub-module and a determination sub-module. The acquisition sub-module can be configured to obtain the first feature and the second feature in the target image. The determination sub-module can be configured to determine the change amount between the first feature and the second feature.

The description of the apparatus embodiments is similar to the description of the method embodiments and has similar beneficial effects as the method embodiments. For technical details not described in the apparatus embodiments, reference can be made to the description of the method embodiments of the present disclosure.

In embodiments of the present disclosure, if the above method is implemented in the form of a software functional module and sold or used as an independent product, the method can also be stored in a computer-readable storage medium. Based on this understanding, the technical solutions of embodiments of the present disclosure, in essence, or the part that contributes to the related technology, can be embodied in the form of a software product. The computer software product can be stored in a storage medium, including several instructions to cause the electronic device (e.g., a mobile phone, tablet, laptop, desktop computer, etc.) to execute all or a part of the methods of embodiments of the present disclosure. The storage mediums can include USB drives, mobile hard disks, Read-Only Memory (ROM), magnetic disks, optical disks, and various media that can store program codes. Thus, embodiments of the present disclosure are not limited to any specific combination of hardware and software.

Correspondingly, embodiments of the present disclosure provide a storage medium storing a computer program. When the computer program is executed by the processor, the steps of the image processing method of embodiments of the present disclosure can be implemented.

The descriptions of the storage medium and device embodiments are similar to the description of the method embodiments and have similar beneficial effects. For technical details not disclosed in the storage medium and device embodiments of the present disclosure, reference can be made to the description of the method embodiments of the present disclosure.

The term "one embodiment" or "an embodiment" mentioned throughout the specification means that a particular feature, structure, or characteristic related to the embodiment is included in at least one embodiment of the present disclosure. Thus, the term "one embodiment" or "an embodiment" does not necessarily refer to the same embodiments in the specification. In addition, the special feature, structure, or characteristic can be combined in any appropriate manner in one or a plurality of embodiments. In embodiments of the present disclosure, the sizes of the sequence numbers of the processes do not mean the sequence of execution. The execution sequence of the processes can be determined according to the functions and internal logic and does not form any limitation on the implementation processes of embodiments of the present disclosure. The sequence numbers of embodiments of the present disclosure are merely for description and do not represent the advantages or disadvantages of embodiments of the present disclosure.

In the specification, the term "comprise," "include," or any other variations thereof are intended to include a non-exclusive inclusion, such that a process, method, article, or apparatus that includes a series of elements not only includes those elements but can also include other elements not explicitly listed, or elements inherent to such process, method, article, or apparatus. Without further limitations, elements defined by the phrase "comprises a . . . " do not exclude the existence of other identical elements in the process, method, article, or apparatus that includes the elements.

In embodiments of the present disclosure, the disclosed device and method can be implemented in other manners. The device embodiments described above are merely illustrative. For example, the division of the units is only a logical functional division, and other division methods can exist in actual implementation. For example, a plurality of units or assemblies can be combined or integrated into another system, or some features can be omitted or not executed. In addition, the coupling, direct coupling, or communicative connection between the displayed or discussed components can be indirect coupling or communicative connection through some interfaces, devices, or units, which can be electrical, mechanical, or other forms.

The units described as separate members may or may not be physically separated. The member displayed as the unit may or may not be a physical unit. The units can be located in one place or distributed over a plurality of network units. Some or all of the units can be selected to achieve the objectives of embodiments of the present disclosure based on actual needs.

Furthermore, in embodiments of the present disclosure, the various functional units can be integrated into one processing unit, or each unit can be used as a single unit, or two or more units can be integrated into one unit. The integrated unit can be implemented in hardware form or in the form of hardware and software functional units.

Those ordinary skills in the art can understand that all or a part of the steps of the method embodiments can be implemented by instructing the hardware using the program instructions. The program can be stored in a computer-readable storage medium. When the program is executed, the steps of the method embodiments can be executed. The storage medium can include mobile storage devices, Read-Only Memory (ROM), magnetic disks, optical disks, and other media that can store program codes.

In some other embodiments, when the integrated units of the present disclosure are implemented in the form of a software functional module and sold or used as independent products, the integrated units can also be stored in a computer-readable storage medium. Based on this understanding, the essence of the technical solutions of embodiments of the present disclosure, or the part that contributes to the related technology, can be embodied in the form of a software product. The computer software product can be stored in a storage medium and include several instructions used to cause the electronic device (e.g., a mobile phone, tablet, laptop, desktop computer, etc.) to execute all or a part of the methods described in embodiments of the present disclosure. The storage medium can include mobile storage devices, ROM, magnetic disks, optical disks, and other media that can store program codes.

The methods disclosed in the method embodiments of the present disclosure can be combined arbitrarily to form new method embodiments when there is no conflict.

The features disclosed in the product embodiments of the present disclosure can be combined arbitrarily to form new product embodiments when there is no conflict.

The features disclosed in the method or device embodiments of the present disclosure can be combined arbitrarily to form new method embodiments or device embodiments when there is no conflict.

The above are merely embodiments of the present disclosure. However, the scope of the present disclosure is not limited to this. Those skilled in the art can think of modifications or replacements within the technical field. The modifications and replacements are within the scope of the present disclosure. Thus, the scope of the present disclosure conforms to the scope of the claims.

What is claimed is:

1. A photosensitive chip comprising:

a photosensitive array configured to generate an induced electrical signal; and a target transmission channel, a target image signal being generated from the induced electrical signal through the target transmission channel, the target image signal being used to generate a target image, and the target image representing a change in a target space;

wherein the target transmission channel includes:

a subtractor configured to perform subtraction on an induced electrical signal at an N-th moment and an induced electrical signal at an (N−1)-th moment to generate a target electrical signal, N being an integer greater than or equal to 1; and an analog-to-digital conversion circuit connected to the subtractor and configured to convert the target electrical signal into the target image signal.

2. The photosensitive chip of claim 1, wherein the target electrical signal includes:

a first type electrical signal used to represent a part of the photosensitive array at the N-th moment and a part of the photosensitive array at the (N−1)-th moment that are same; and a second type electrical signal different from the first type electrical signal and used to represent a part of the photosensitive array at the N-th moment and a part of the photosensitive array at the (N−1)-th moment that are different.

3. The photosensitive chip of claim 1, further comprising:

a memory connected to the subtractor and configured to store the induced electrical signal at the (N−1)-th moment.

4. The photosensitive chip of claim 1, further comprising:

a first transmission channel, a first image signal being generated from the induced electrical signal by the first transmission channel, the first image signal being used to generate the first image, and the first image representing the target space;

a second transmission channel including the target transmission channel; and a third transmission channel connected to the memory, the induced electrical signal being stored through the third transmission channel.

5. The photosensitive chip of claim 4, wherein the induced electrical signal reaches the subtractor through the third transmission channel one moment later than the induced electrical signal reaches the subtractor through the second transmission channel.

6. The photosensitive chip of claim 4, further comprising:

an input interface configured to obtain target instructions; and an output interface configured to output the first image signal and the target image signal based on the target instructions.

7. An image processing method comprising:

obtaining a target image, the target image being generated from a target image signal provided by a photosensitive chip of an image collection apparatus, and the target image representing a change in a target space collected by the image collection apparatus; and processing the target image to obtain a change amount in the target space;

wherein the photosensitive chip includes:

a photosensitive array configured to generate an induced electrical signal; and a target transmission channel, the target image signal being generated from the induced electrical signal through the target transmission channel, and the target transmission channel including:

a subtractor configured to perform subtraction on an induced electrical signal at an N-th moment and an induced electrical signal at an (N−1)-th moment to generate a target electrical signal, N being an integer greater than or equal to 1; and an analog-to-digital conversion circuit connected to the subtractor and configured to convert the target electrical signal into the target image signal.

8. The method of claim 7, further comprising:

obtaining a first image, the first image being generated from a first image signal provided by the photosensitive chip of the image collection apparatus, the first image representing the target space, the first image signal and the target image signal being induced electrical signals induced at the same moment by the photosensitive chip of the image collection apparatus; and determining a target object based on the first image and the target image, the target object representing an object that changes in the target space;

wherein, a change amount of target space being obtained by processing the target image represents a change amount of the target object.

9. The method of claim 8, wherein determining the change amount of the target object based on the first image and the target image includes:

obtaining the target object that meets feature matching based on the first image and the target image.

10. An electronic device, comprising:

an image collection apparatus including a photosensitive chip including:

a photosensitive array configured to generate an induced electrical signal; and a target transmission channel, a target image signal being generated from the induced electrical signal through the target transmission channel, the target image signal being used to generate a target image, and the target transmission channel including:

a subtractor configured to perform subtraction on an induced electrical signal at an N-th moment and an induced electrical signal at an (N−1)-th moment to generate a target electrical signal, N being an integer greater than or equal to 1; and an analog-to-digital conversion circuit connected to the subtractor and configured to convert the target electrical signal into the target image signal; and a processor configured to instruct the image collection apparatus with target instructions to cause the image collection apparatus to provide the target image, the target image representing a change in a target space collected by the image collection apparatus.

11. The electronic device of claim 10, wherein the image collection apparatus further includes:

a camera lens configured to project light of a photographed object at the photosensitive chip to form the target image.

12. The electronic device of claim 11, wherein the target electrical signal includes:

a first type electrical signal used to represent a part of the photosensitive array at the N-th moment and a part of the photosensitive array at the (N−1)-th moment that are same; and a second type electrical signal different from the first type electrical signal and used to represent a part of the photosensitive array at the N-th moment and a part of the photosensitive array at the (N−1)-th moment that are different.

13. The electronic device of claim 11, wherein the photosensitive chip further includes:

a memory connected to the subtractor and configured to store the induced electrical signal at the (N−1)-th moment.

14. The electronic device of claim 11, wherein the photosensitive chip further includes:

a first transmission channel, a first image signal being generated from the induced electrical signal by the first transmission channel, the first image signal being used to generate the first image, and the first image representing the target space;

a second transmission channel including the target transmission channel; and a third transmission channel connected to the memory, the induced electrical signal being stored through the third transmission channel.

15. The electronic device of claim 14, wherein the induced electrical signal reaches the subtractor through the third transmission channel one moment later than the induced electrical signal reaches the subtractor through the second transmission channel.

16. The electronic device of claim 14, wherein the photosensitive chip further includes:

an input interface configured to obtain target instructions; and an output interface configured to output the first image signal and the target image signal based on the target instructions.

* * * * *